May 28, 1946.  R. RICHARDS  2,401,105
DEVICE FOR USE IN THE MAKING OF DRAWINGS
Filed Nov. 1, 1944
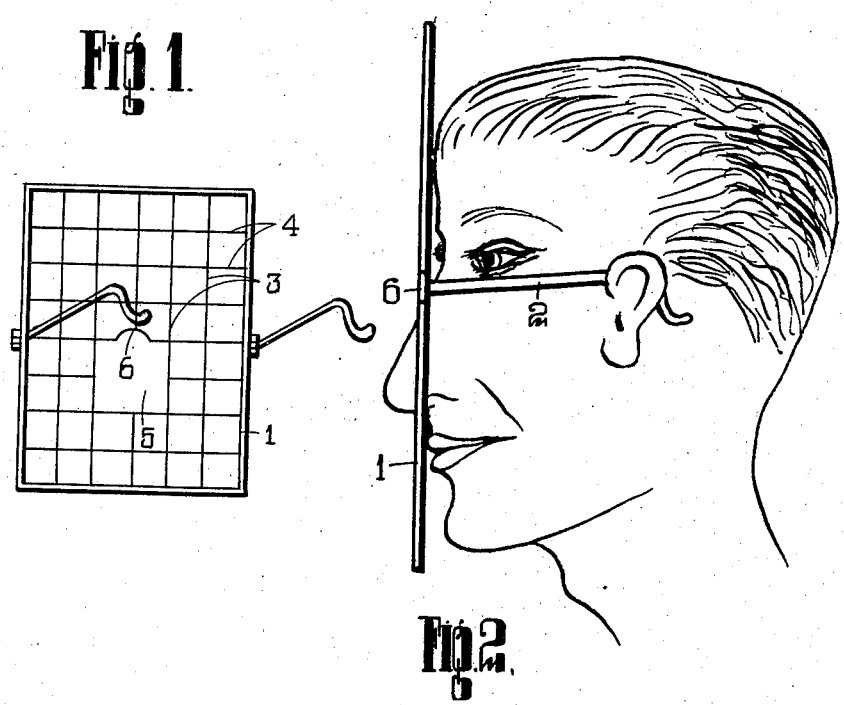
Inventor
Raymond Richards
By
Mason, Porter & Diller
Attorneys Patented May 28, 1946

2,401,105

UNITED STATES PATENT OFFICE 2,401,105

DEVICE FOR USE IN THE MAKING OF DRAWINGS

Raymond Richards, Birkdale, Southport, England

Application November 1, 1944, Serial No. 561,451
In Great Britain December 10, 1943

1 Claim. (Cl. 35—26)

The present invention relates to a device for use in the making of drawings.

An object of the present invention is to enable persons rapidly to make accurate drawings of objects, although they may not have inherent artistic skill.

The invention is more particularly described with reference to the accompanying drawing, in which:

Fig. 1 is a perspective view of the device,
Fig. 2 is a side view of the device in use.

The invention comprises a rectangular frame 1 to which is hinged a pair of drop-ended or curled sides 2, similar to the sides of a pair of spectacles. This frame carries an open grid formed of vertical wires 3 and horizontal wires 4, a cut away portion 5 being provided in the frame, while the horizontal wire at or above the plane of the hinges of the sides 2 may be provided with a recess, as shown at 6, so that the frame can be supported over the face of a person, as shown in Fig. 2.

Another person then facing the wearer of such a device, and preferably using paper ruled to provide squares, can make an accurate drawing of the front view of the face of the person wearing the spectacle frame as shown in Fig. 1, without of necessity being a skilled artist, and the device may therefore be used to teach front-view portrait drawing.

I declare that what I claim is:

A device for use in the making of drawings consisting of a planar frame, a grid formed of two sets of wires at right angles to one another supported by said frame and disposed in the plane of said frame, part of said grid being cut away at its centre to form an open space with one part of one horizontal wire bowed to form a support for the nose of a human head, and a pair of spectacle sides hinged rigidly to opposite sides of said frame.

RAYMOND RICHARDS.